United States Patent
Baba et al.

(10) Patent No.: US 7,417,776 B2
(45) Date of Patent: Aug. 26, 2008

(54) HOLOGRAM RECORDING AND REPRODUCTION METHOD, HOLOGRAM RECORDING AND REPRODUCTION APPARATUS, AND HOLOGRAM RECORDING MEDIUM

(75) Inventors: Shigeyuki Baba, Tokyo (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 11/049,725

(22) Filed: Feb. 4, 2005

(65) Prior Publication Data

US 2005/0185233 A1    Aug. 25, 2005

(30) Foreign Application Priority Data

Feb. 9, 2004    (JP)    ............... 2004-031805

(51) Int. Cl.
*G03H 1/08*    (2006.01)
(52) U.S. Cl. ............................. 359/9; 359/29
(58) Field of Classification Search ............... 359/9, 359/29
See application file for complete search history.

(56) References Cited

U.S. PATENT DOCUMENTS 6,763,142 B2 *   7/2004   Dai et al. ................... 382/260
6,961,161 B2 *  11/2005   Tsukagoshi et al. ........... 359/10

* cited by examiner

*Primary Examiner*—Fayez G Assaf
(74) *Attorney, Agent, or Firm*—Oblon, Spivak, McClelland, Maier & Neustadt, P.C.

(57) ABSTRACT

A method and apparatus is disclosed which can reproduce multi-value data with high reproducibility from a hologram recording medium having data recorded in multi-values therein and can reduce the error rate of reproduction data. A reference gradation pattern is recorded in a medium, and luminance unevenness of a gradation pattern obtained by reproducing the gradation pattern is corrected. A gamma characteristic of the medium is determined based on the reproduction gradation pattern, and a modulation pattern produced using easily separable luminance values determined based on the gamma characteristic is displayed on a spatial light modulator to record data in multi-values into the medium. Thereupon, the data are oversampled and recorded, and a block of the reproduced data is decoded depending upon a sequence of relative luminance levels of pixels in the block to decode the entire reproduced multi-value data.

9 Claims, 8 Drawing Sheets

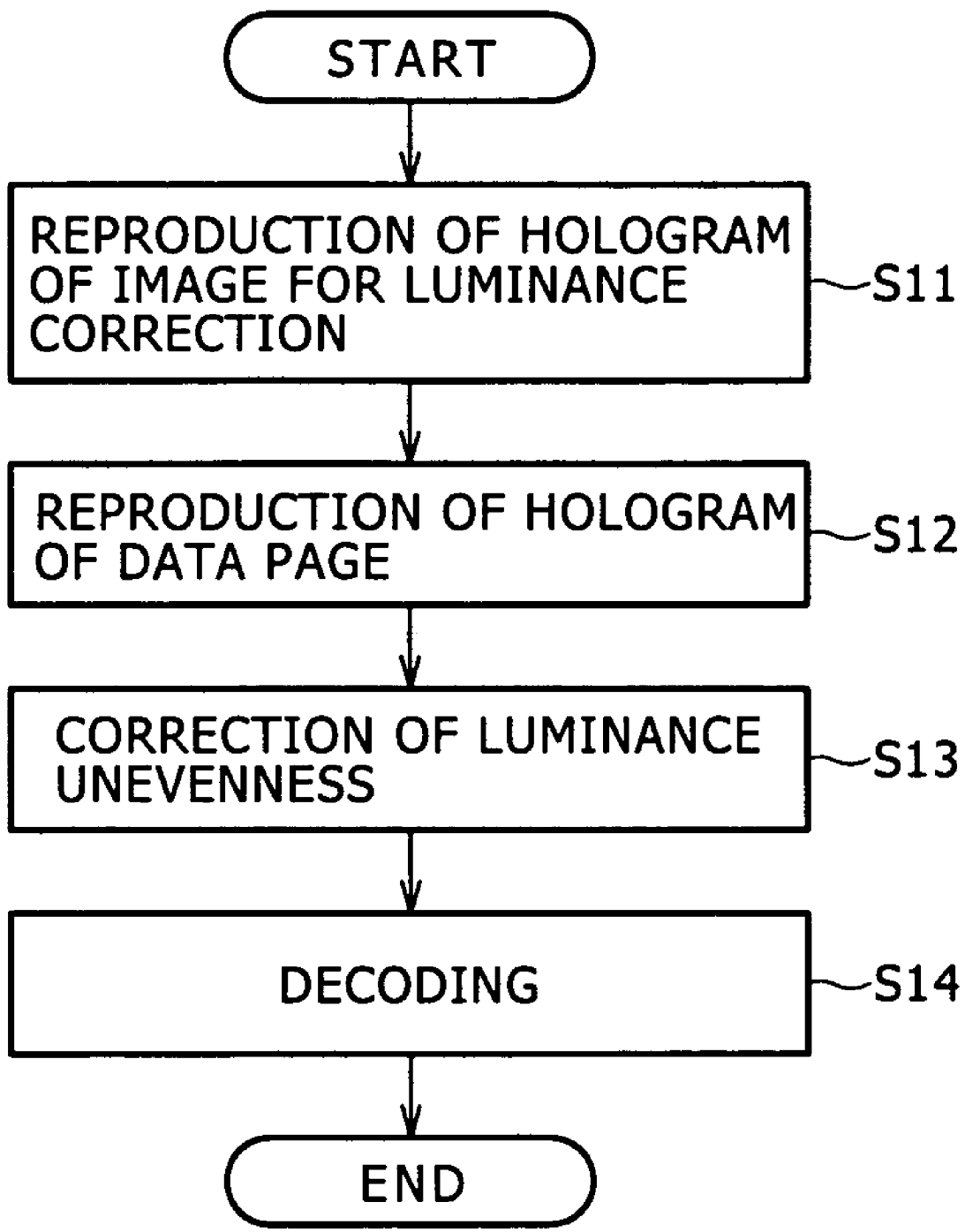

HOLOGRAM RECORDING AND REPRODUCTION METHOD, HOLOGRAM RECORDING AND REPRODUCTION APPARATUS, AND HOLOGRAM RECORDING MEDIUM

BACKGROUND OF THE INVENTION

This invention relates to a hologram recording and reproduction apparatus, and more particularly to a hologram recording and reproduction method for recording and reproducing multi-value information into and from a hologram recording medium.

In recent years, increase in recording density of optical disks and so forth has been and is proceeding. However, since the increasing recording density is approaching a physical limit to high density recording, attention is paid to a hologram storage in order to further increase the recording capacity. The hologram storage adopts a recording method of the volume type and allows storage of a greater amount of information when compared with a medium of the planar recording type such as an optical disk. However, if the hologram storage allows multi-value (three- or more-value) recording, then the recording capacity of the hologram storage can be further increased. For such multi-value recording of the hologram storage, multi-value recording depending upon the light intensity is supposed as disclosed, for example, in U.S. Pat. No. 6,512,733.

However, in reproduction of data recorded in a hologram, where the recorded data are, for example, three-value data, a middle gradation must be reproduced. However, the gradation reproducibility is low. According to hologram recording media used at present, an output luminance level characteristic with respect to an input luminance level is represented by a region having a certain extent. This does not decide an output luminance level uniquely with respect to an input luminance level but allows presence of a plurality of output luminance levels. Consequently, different input luminance levels are sometimes represented by the same output luminance level, and in this instance, the gradation reproducibility is low. Further, it is generally difficult to separate different values of data upon decoding of the data upon reproduction, and therefore, reproduction data exhibit a high error rate.

SUMMARY OF THE INVENTION

It is an object of the present invention to provide a hologram recording and reproduction method, a hologram recording and reproduction apparatus and a hologram recording medium by which multi-value data can be reproduced with a high degree of reproducibility from a hologram recording medium in which data are recorded in multi-values and the error rate of reproduction data can be reduced.

According to the present invention, the object described above is achieved by determining a gamma characteristic of a hologram recording medium after illuminance unevenness correction, using easily separable luminance values determined based on the gamma characteristic of the hologram recording medium to produce a modulation pattern to perform multi-value recording of data by oversampling and decoding reproduction data of the thus recorded data depending upon relative differences of luminance levels of the reproduction data.

In particular, according to an aspect of the present invention, there is provided a hologram recording method for recording multi-value data as interference fringes of recording light and reference light into a hologram recording medium, including a step of recording a reference gradation pattern into the hologram recording medium.

According to another aspect of the present invention, there is provided a hologram recording method for recording multi-value data as interference fringes of recording light and reference light into a hologram recording medium, including the steps of recording fixed luminance data into the hologram recording medium, and recording a reference gradation pattern into the hologram recording medium.

According to a further aspect of the present invention, there is provided a hologram reproduction method for reproducing data recorded in multi-values by illuminating illumination reference light on a hologram recording medium, including a step of sequencing relative luminance levels of a plurality of pixels in a block corresponding to the reproduced multi-value data to decode the multi-value data.

According to a still further aspect of the present invention, there is provided a hologram recording and reproduction apparatus which records multi-value data as interference fringes of recording light and reference light into a hologram recording medium and illuminates illumination reference light on the hologram recording medium to reproduce the multi-value data, including a recording section for recording a reference gradation pattern into the hologram recording medium, a reproduction section for reproducing the reference gradation pattern from the hologram recording medium, and a correction section for correcting gradations of a modulation image produced by intensity modulating the recording light based on the reproduced gradation pattern.

According to a yet further aspect of the present invention, there is provided a hologram recording and reproduction apparatus for recording multi-value data as interference fringes of recording light and reference light into a hologram recording medium, including a first recording section for recording fixed luminance data into the hologram recording medium, a second recording section for recording a reference gradation pattern into the hologram recording medium, a first reproduction section for reproducing the fixed luminance data from the hologram recording medium, a correction value acquisition section for acquiring luminance unevenness correction values based on the reproduced fixed luminance data, a second reproduction section for reproducing a gradation pattern from the hologram recording medium, a luminance unevenness correction section for correcting luminance unevenness of the reproduced gradation pattern using the acquired luminance unevenness correction values, and a gradation correction section for correcting gradations of a modulation image produced by intensity modulating the recording light based on the gradation pattern whose luminance unevenness is corrected.

According to an additional aspect of the present invention, there is provided a hologram recording medium into which data are recorded as interference fringes of recording light and reference light, the hologram recording medium having recorded therein fixed luminance data for correcting luminance unevenness of reproduction data reproduced from the hologram recording medium.

According to another additional aspect of the present invention, there is provided a hologram recording medium into which data are recorded as interference fringes of recording light and reference light, the hologram recording medium having recorded therein a gradation pattern for measuring a gamma characteristic for correcting gradations of multi-value data recorded in the hologram recording medium.

In summary, in the present invention, a reference gradation pattern is recorded in advance in a hologram recording medium, and a gamma characteristic representative of a relationship between an input luminance and an output luminance to and from the hologram recording medium is determined based on a reproduction gradation pattern obtained by reproducing the gradation pattern. Then, easily separable luminance values determined based on the gamma characteristic are used to produce a modulation pattern to perform multi-value recording of data. This can reduce the bit error rate of reproduction data. More particularly, for example, all-white data having a fixed luminance are recorded in advance in the hologram recording medium, and luminance unevenness correction values are determined based on reproduction all-white data obtained by reproducing the recorded all-white data. Then, the luminance unevenness correction values are used to correct luminance unevenness of the reproduction gradation pattern to raise the accuracy of the gamma characteristic. This can further reduce the bit error rate of the reproduction multi-value data. Further, decoding of a block of the reproduced data is performed by sequencing relative luminance levels of pixels in the block to perform decoding of the entire reproduced multi-value data. Consequently, even if absolute luminance levels upon recording and upon reproduction are different from each other, if the relative luminance levels are different within the symbol, then correct data can be obtained, and therefore, the multi-value data can be decoded.

With the hologram recording methods, hologram reproduction method, hologram recording and reproduction apparatus and hologram recording media according to the present invention, the bit error rate of reproduction data can be reduced by determining a gamma characteristic of a hologram recording medium and using luminance values determined based on the gamma characteristic of the hologram recording medium and easily separable from one another to produce a modulation pattern to perform multi-value recording of the data.

Further, the bit error rate when the multi-value data are reproduced can be further reduced by determining luminance unevenness when the data are recorded into and reproduced from the hologram recording medium and correcting luminance unevenness of the reproduction gradation pattern based on the determined luminance unevenness to raise the accuracy of the gamma characteristic obtained.

Furthermore, since a block of reproduced data is decoded depending upon a sequence of relative luminance levels of pixels in the block to perform decoding of the entire reproduced multi-value data, even if absolute luminance levels cannot be reproduced, correct data can be obtained if differences of the relative luminance levels can be discriminated. Therefore, multi-value recorded data can be decoded upon reproduction thereof.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 9 is a flow chart illustrating a reproduction processing procedure of multi-value recorded data by the hologram recording and reproduction apparatus of FIG. 1.

DETAILED DESCRIPTION OF THE PREFERRED EMBODIMENT

Figure 1:
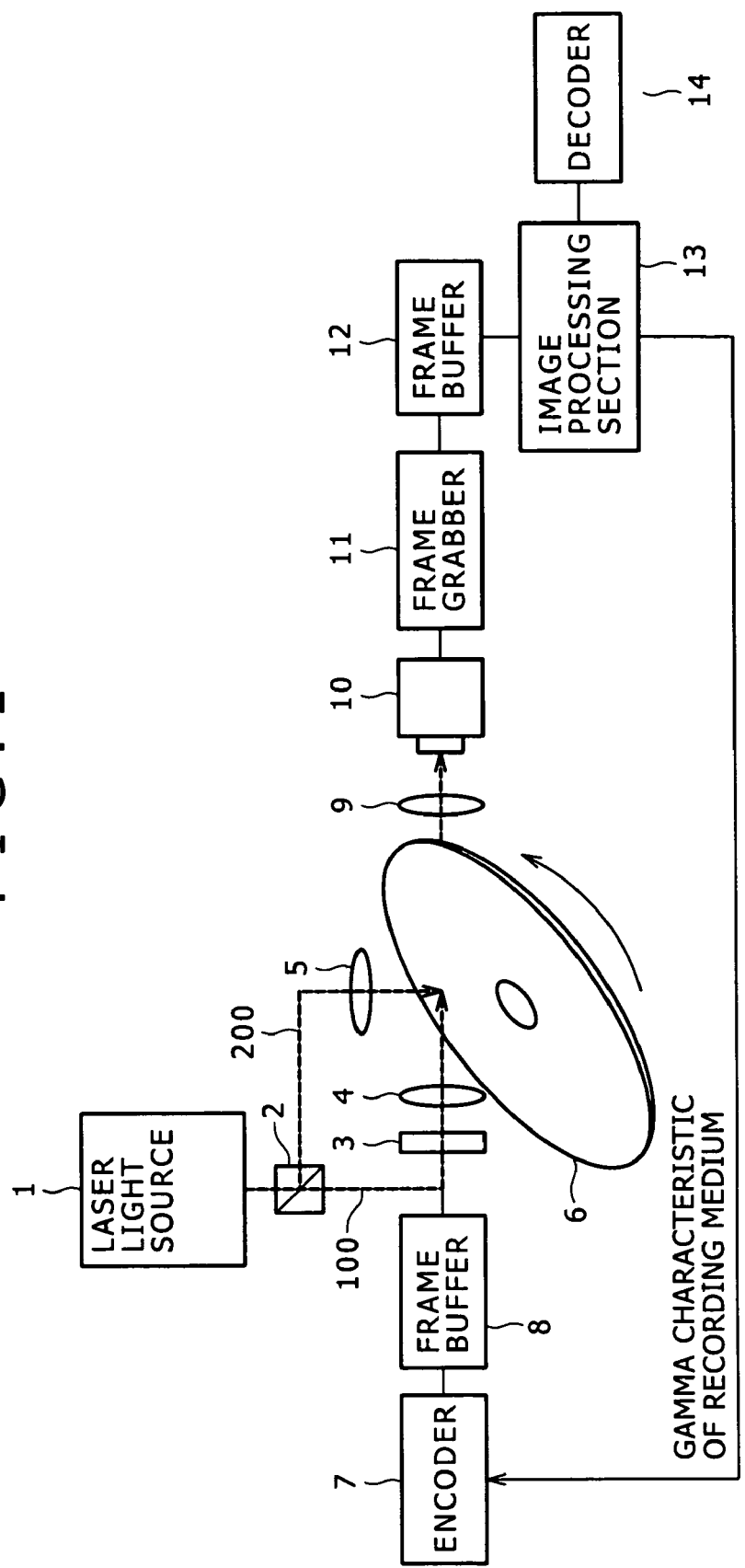
FIG. 1 is a block diagram showing a general configuration of a hologram recording and reproduction apparatus to which the present invention is applied.

Referring first to FIG. 1, there is shown a general configuration of a hologram recording and reproduction apparatus to which the present invention is applied. The hologram recording and reproduction apparatus shown includes a laser light source 1, a beam splitter 2, a spatial light modulator 3, a lens (Fourier lens) 4, another lens 5, a hologram recording medium 6, an encoder 7, and a frame buffer 8. The hologram recording and reproduction apparatus further includes a further lens (inverse Fourier lens) 9, an image sensor 10, a frame grabber 11, a frame buffer 12, an image processing section 13, and a decoder 14.

Now, operation of the hologram recording and reproduction apparatus is described. Multi-value hologram recording involves difficulty in decoding of data because the gradation reproducibility in hologram recording is low. Therefore, before multi-value hologram recording is performed, the gamma characteristic of the hologram recording material is measured by hologram recording of a gradation pattern wherein each block is formed from pixels having a value from among 0 to 255 (representing a luminance), and a multi-value modulation code is produced in accordance with the characteristic to perform hologram recording.

Figure 2:
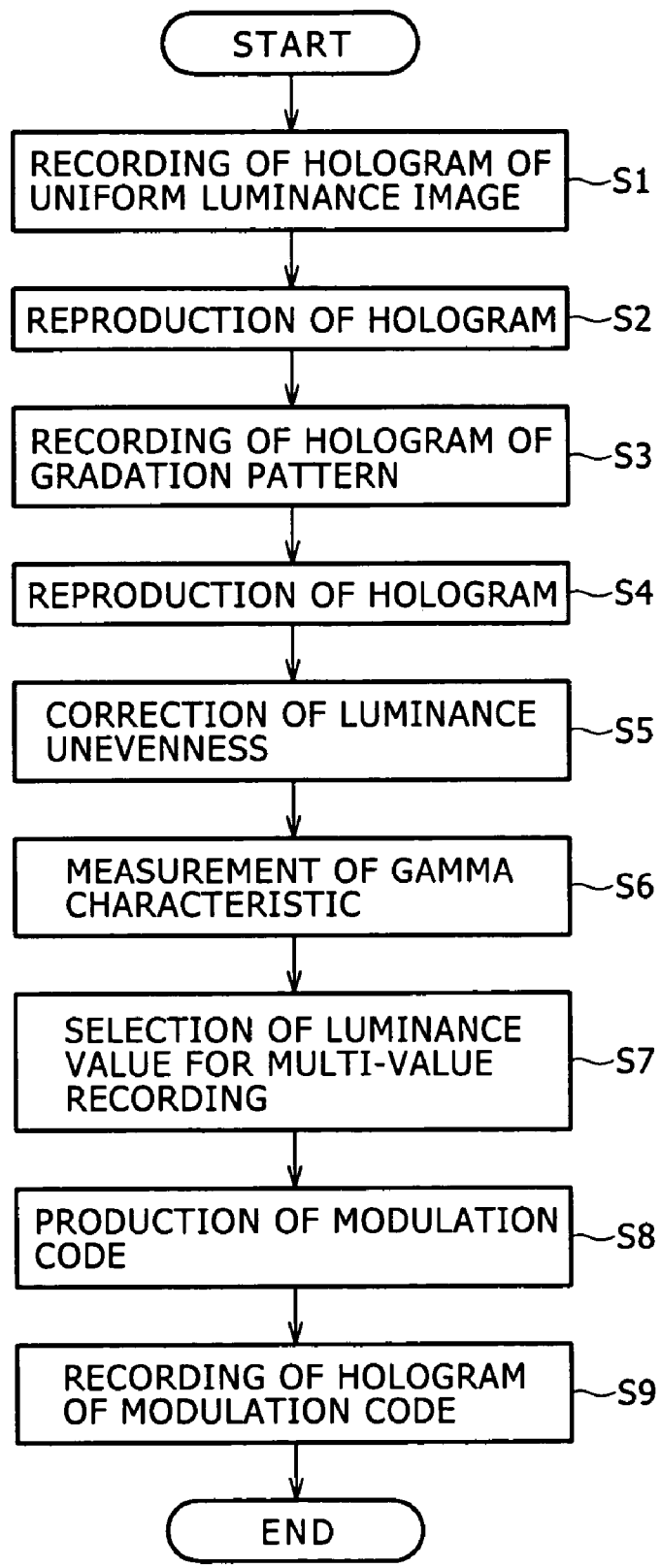
FIG. 2 is a flow chart illustrating a multi-value recording processing procedure of data by the hologram recording and reproduction apparatus of FIG. 1.

Individual processes in such hologram recording are described successively below with reference to a flow chart of FIG. 2. First at step S1, in order to correct unevenness in luminance originating from a hologram optical system, a pattern image (luminance unevenness correcting image) having pixels all of which have a luminance of, for example, 255 is recorded in hologram into the hologram recording medium 6.

In particular, the luminance unevenness correcting image is displayed on the spatial light modulator 3 through the frame buffer 8 without being modulated by the encoder 7. Thereafter, a coherent laser beam emitted from the laser light source 1 enters the beam splitter 2, by which it is branched into signal light (first light beam) 100 and reference light (second light beam) 200. The signal light 100 is introduced through a signal optical system (not shown) into and spatially optically modulated (intensity modulated) by the spatial light modulator 3. The modulated light is condensed on the hologram recording medium 6 by the lens 4. Meanwhile, the reference light 200 is illuminated on the hologram recording medium 6 by the lens 5 through a reference optical system (not shown). Consequently, the signal light 100 and the reference light 200 interfere with each other within the hologram recording medium 6, and consequently, the luminance unevenness correcting image (for example, all-white image) is recorded in hologram into the hologram recording medium 6.

At step S2, the luminance unevenness correcting image recorded in the hologram recording medium 6 is reproduced. In particular, illumination reference light same as the reference light 200 is introduced into the hologram recording medium 6, whereupon data are reproduced as diffracted light corresponding to interference fringes recorded in the hologram recording medium 6. The diffracted light is received by the image sensor 10, which may be a CCD image sensor or a CMOS image sensor, through the lens 9. Thus, a digital image signal or an analog image signal is outputted from the image sensor 10 and image formatted in a unit of a frame by the frame grabber 11, whereafter they are stored into the frame buffer 12. Thereafter, the image processing section 13 performs positioning of a data page read out from the frame buffer 12 and calculates a luminance unevenness correction coefficient. It is to be noted that, in order to minimize the influence of random noise by the image sensor 10 upon image pickup, the same reproduction image is picked up, for example, by 10 times, and an arithmetic mean image is produced from the thus picked up 10 images and used for calculation of the luminance unevenness correction coefficient.

Figure 3A:
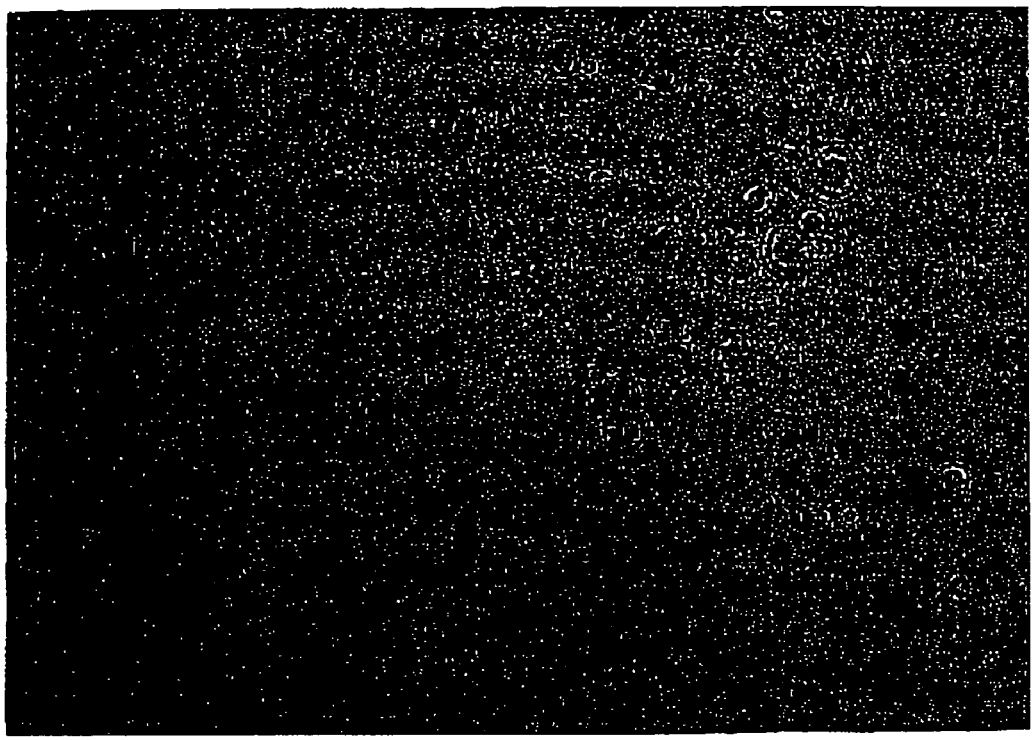
FIGS. 3A and 3B are views showing an example of an image having uneven luminance when all-white data are recorded and reproduced by the hologram recording and reproduction apparatus of FIG. 1 and an image obtained by correction of the uneven-luminance image, respectively.

Since the luminance unevenness correcting image (for example, all-white image) reproduced in this manner includes luminance unevenness originating from the optical system, for example, it may be such an image as shown in FIG. 3A and all of the pixel values do not have a uniform value. It is to be noted that, in order to minimize the influence of random noise by the image sensor 10 upon image pickup, the same reproduction image is picked up, for example, by 10 times, and an arithmetic mean image is produced from the thus picked up 10 images and used.

Figure 4:
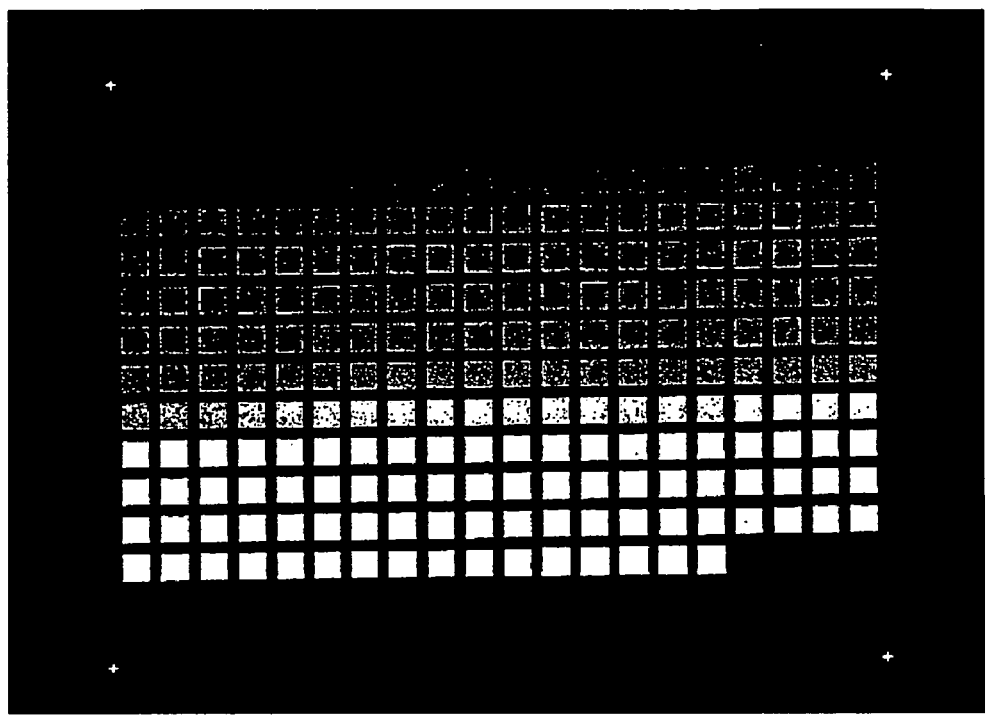
FIG. 4 is a view showing a calibration pattern to be recorded into a hologram recording medium by means of the hologram recording and reproduction apparatus of FIG. 1.

At step S3, such a calibration pattern for gradation correction as shown in FIG. 4 is recorded similarly into the hologram recording medium 6. Then at step S4, the calibration pattern for gradation correction is reproduced to obtain a gradation correcting image. Also in this reproduction, the same hologram is reproduced by a plural number of times and an arithmetic mean image is produced from the resulting plural images similarly as upon image pickup of the luminance unevenness correcting image.

Since also the image reproduced at step S4 includes luminance unevenness originating from the optical system, even if the image is used as it is, a correct gamma characteristic cannot be measured. Therefore, this correction is performed at step S5 using the luminance unevenness correcting image reproduced in advance.

Figure 3B:
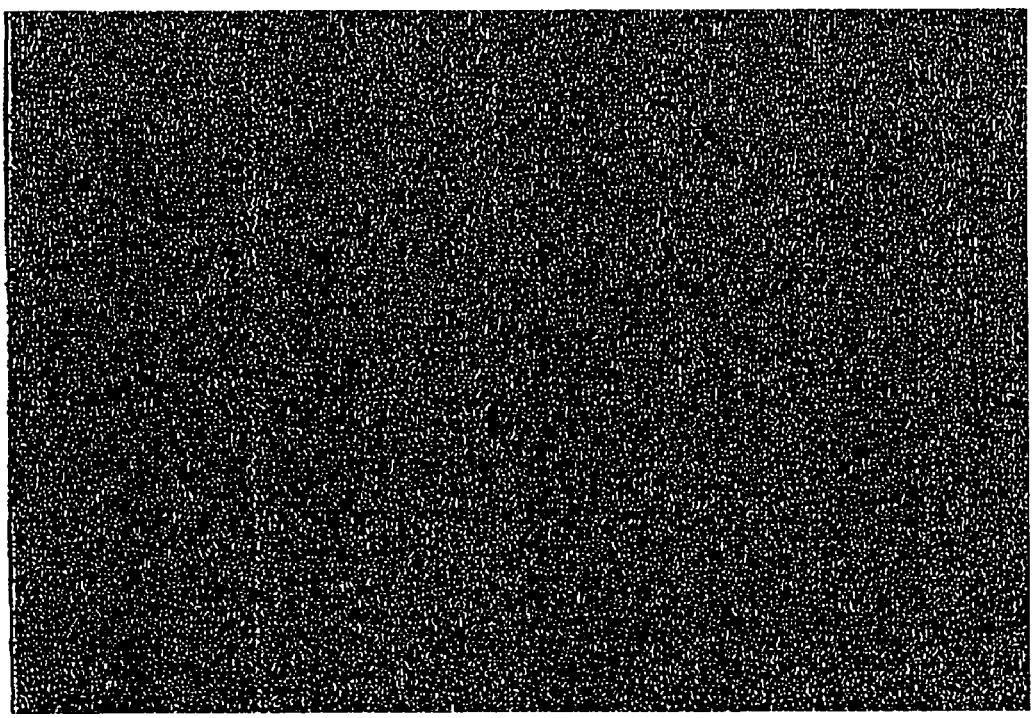

At step S5, the correction method is implemented by determining, using all pixel values of the luminance unevenness correcting image (luminance values of the image), the correction coefficient for each pixel in accordance with $\alpha/I_{ij}$ ($\alpha$ is a constant and corresponds to a luminance value of the input image) and applying the coefficients to all of the pixels of the calibration pattern image reproduced at step S4. For example, if the luminance unevenness correction is performed for the all-white hologram reproduction image of FIG. 3A in order to simplify explanation, then such an image as seen in FIG. 3B is obtained and exhibits improvement in terms of luminance unevenness.

Figure 5:
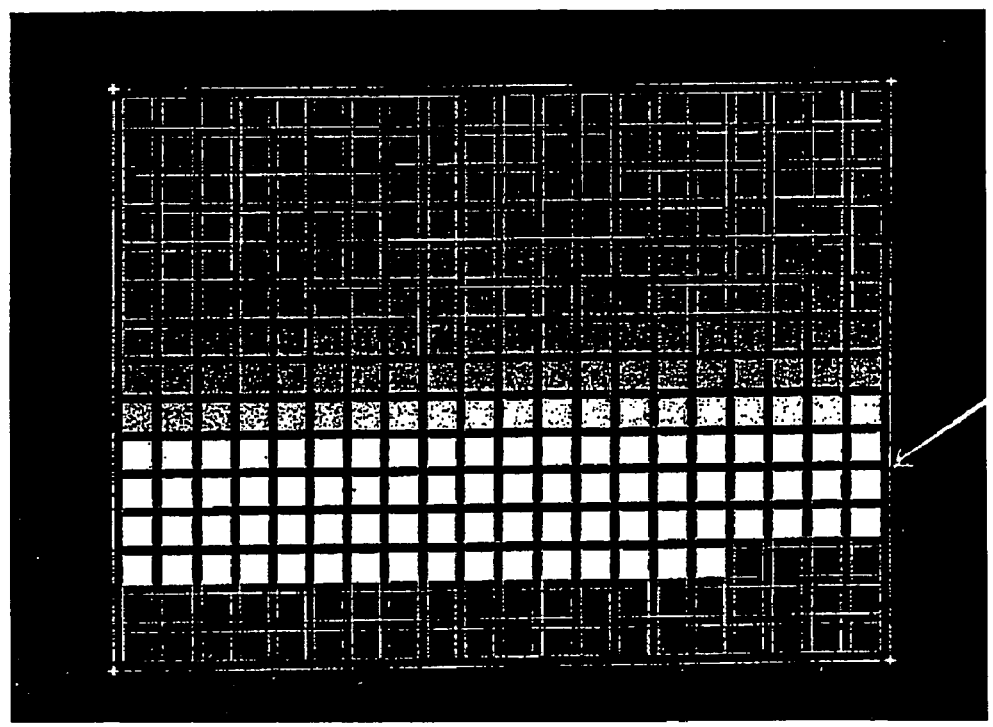
FIG. 5 is a view illustrating positioning of the calibration pattern shown in FIG. 4.
Figure 6:
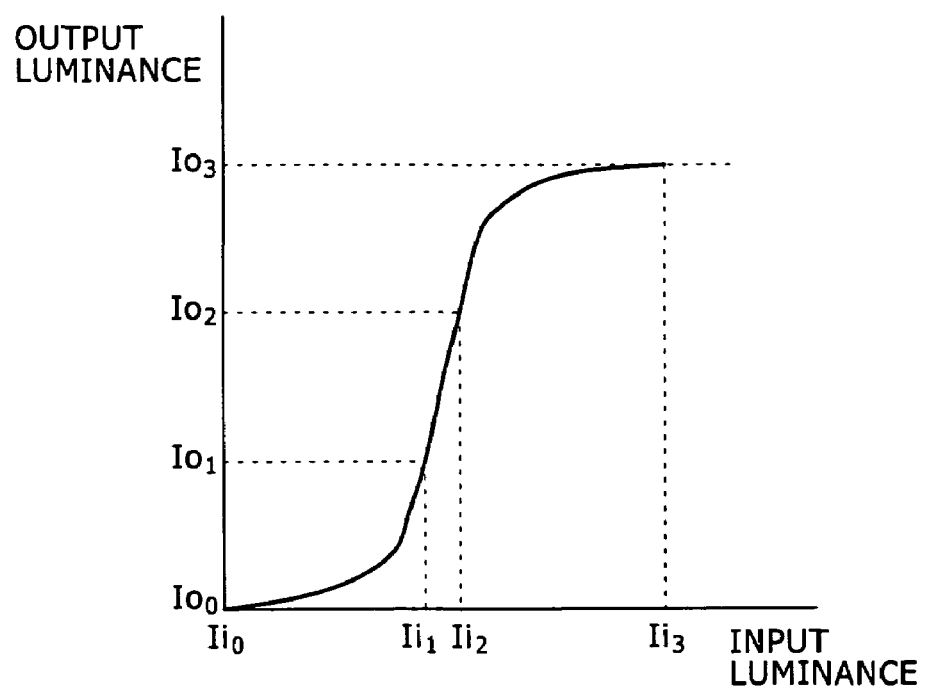
FIG. 6 is a diagram illustrating a gamma characteristic of a hologram recording medium shown in FIG. 1.

At step S6, the reproduction image of the calibration pattern (in the example of FIG. 4, the gradations from 0 to 255 are displayed in units of a block) for which the luminance unevenness correction has been performed in such a manner as described above is used to perform measurement of the gamma characteristic. The method for measurement is described below. First, the coordinates of the positions of alignment marks recorded on the calibration pattern image (in FIG. 4, cross marks at the four corners of the image: the marks are not limited in shape to the cross marks but may be any shape which allows such positioning of the image) are automatically detected, for example, in accordance with an image recognition algorithm such as template matching by the image processing section 13. Then, positioning of the pattern is performed in such a manner as shown in FIG. 5 using the detected coordinate values. Then, such grids as indicated by grid lines 40 are used to automatically cut out the blocks which form the gradation pattern. For each of the thus cut out blocks, a mean value of all pixels which form the block is calculated, and, for example, if the block corresponds to the luminance value 255, then the calculated mean value is set as a value (output pixel value) corresponding to 255. If the relationship between the output luminance values and the input luminance values is represented by a graph, then ideally such a gamma curve as shown in FIG. 6 can be obtained.

At step S7, a luminance value to be used for modulation with multi-values is selected based on the resulting gamma characteristic. Although description is given here of an example wherein four values are used, naturally the technique described below can be applied to any other multi-values. On the gamma curve of FIG. 6, four luminance values are selected on the output value side. At this time, distances between output values which are as great as possible are selected so as to facilitate later decoding. In the example of FIG. 6, four luminance values of $I_{o0}$, $I_{o1}$, $I_{o2}$ and $I_{o3}$ are selected at equal distances. The corresponding relationship between the selected output luminance values and the input luminance values is apparent from the gamma curve, and input luminance values $I_{i0}$, $I_{i1}$, $I_{i2}$ and $I_{i3}$ having corrected gradations are obtained from the gamma curve.

Figure 7:
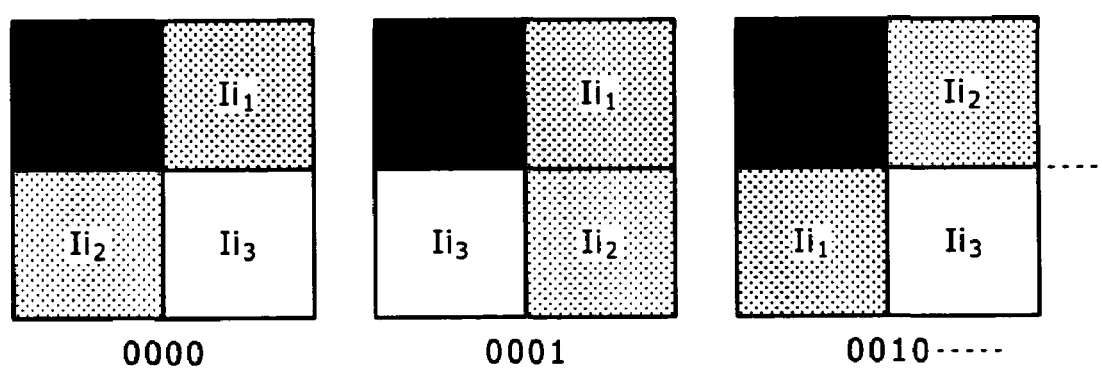
FIG. 7 is a schematic view illustrating an example of block modulation of multi-value data by the hologram recording and reproduction apparatus of FIG. 1.
Figure 8:
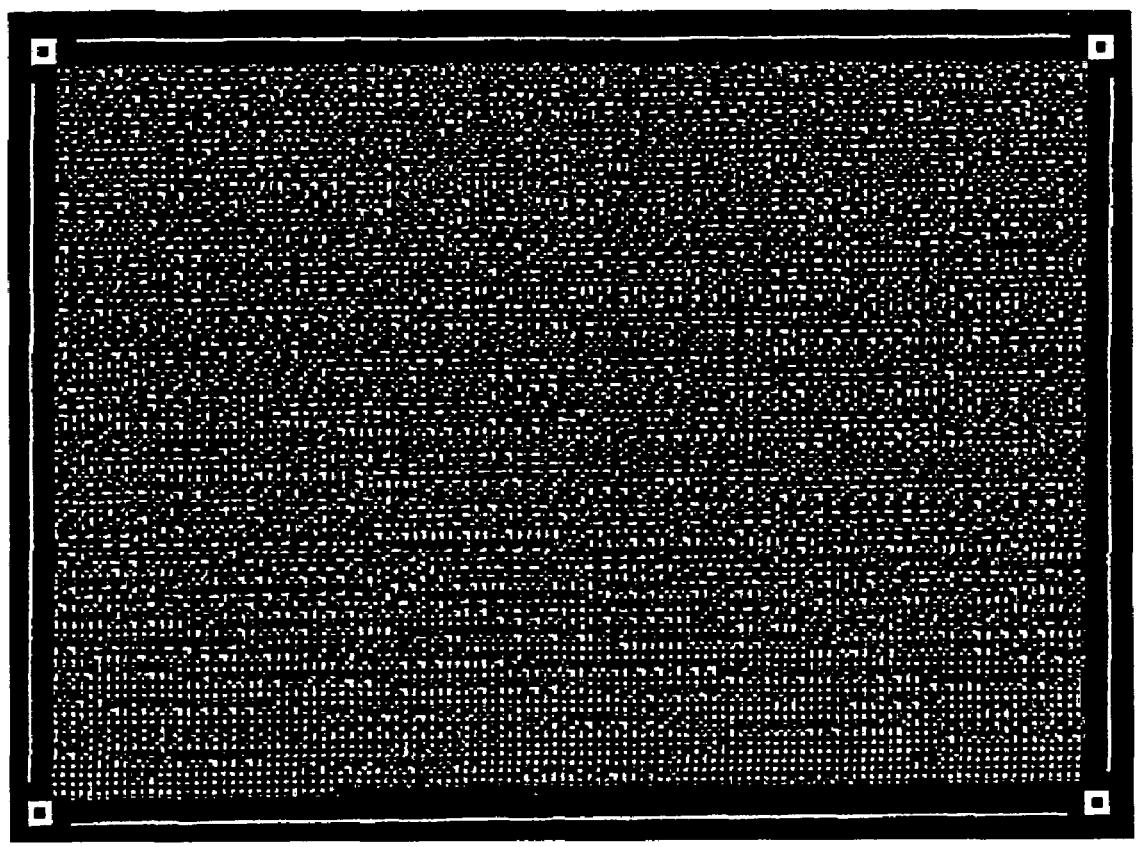
FIG. 8 is a view showing an example of a modulation code displayed on a spatial light modulator shown in FIG. 1.

At step S8, a modulated image is produced from the four input luminance values obtained at step S7 and modulation of the signal light 100 is performed with the modulation image by the spatial light modulator 3, and the modulated signal light 100 is used for recording of the hologram recording medium 6. Here, description is given taking block modulation of one block including 2×2 pixels as shown in FIG. 7 as an example. According to the block modulation, one of the four selected pixel values is allocated to each of the pixels which form the block to perform modulation. Four bits are represented by an array of the 4 pixels (oversampling), and FIG. 7 shows three bit patterns. If this block modulation is applied to all of the pixels of the data page, then such a modulation code with four values as seen in FIG. 8 is produced and displayed on the spatial light modulator 3 (1,024×768 pixels). Then at step S9, the data page is recorded in hologram into the hologram recording medium 6.

Now, operation of reproducing multi-value data recorded in the hologram recording medium 6 in such a manner as described above is described with reference to a flow chart of FIG. 9. At step S11, the image for luminance correction recorded in the hologram recording medium 6 by the process (step S1) of recording multi-value data illustrated in FIG. 2 are first reproduced and stored into the frame buffer 12. Also such reproduction is performed by a plural number of times and an arithmetic mean image is produced similarly as in correction upon recording to suppress random noise originating from the image sensor 10 and so forth. The image processing section 13 calculates and stores luminance unevenness coefficients of the individual pixels from the arithmetic mean image similarly as upon recording.

At step S12, multi-value data recorded in the hologram recording medium 6 are reproduced. Upon such reproduction, the image processing section 13 first performs positioning of the reproduction multi-value image using the markers of the reproduction multi-value image and then applies the calculated luminance unevenness coefficients to the pixels of the reproduction multi-value image to perform correction of the data of the pixels (step S13). The corrected reproduction multi-value data are transferred to the decoder 14, by which they can be decoded to obtain the original image (step S14).

Here, the decoding of data by the decoder 14 at step S14 is described more particularly. The decoding is performed for each of element blocks (symbols) which form the data. For example, where the modulation method described above is used, comparison between luminance values of pixels in each block of 2×2 pixels is performed, and sequencing of the pixels based on the pixel values is performed.

Figures 10A, 10B:
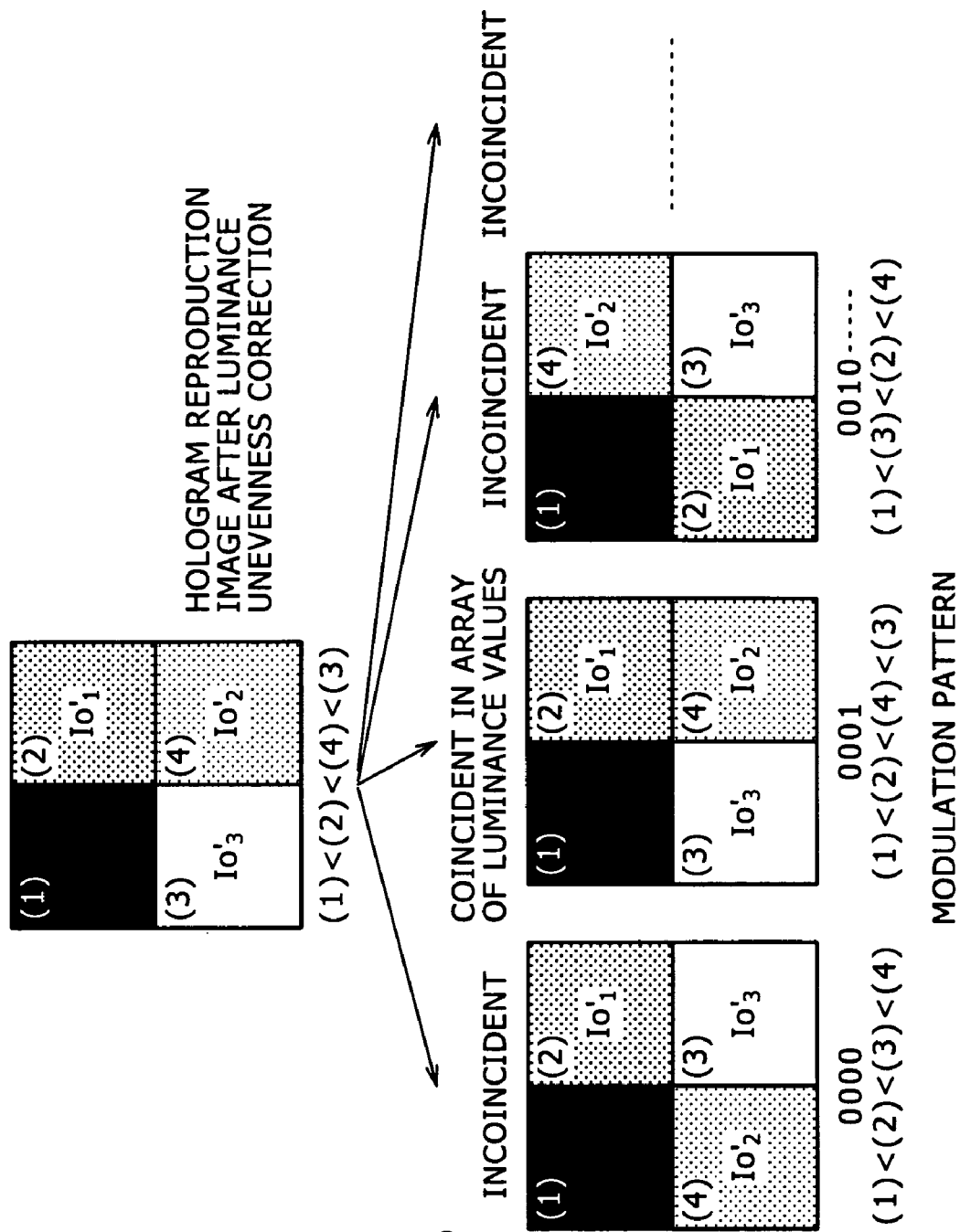
FIGS. 10A and 10B are schematic views illustrating decoding operation of a decoder shown in FIG. 1.

FIGS. 10A and 10B illustrate a manner of the decoding. In FIGS. 10A and 10B, numbers (1), (2), (3) and (4) denote pixel numbers of a modulation unit block, Ii0, Ii1, Ii2 and Ii3 input luminance values, and Io'0, Io'1, Io'2 and Io'3 luminance values of the hologram reproduction image (after the luminance unevenness correction).

Usually, even if correction for luminance unevenness is performed, the luminance values Ii0, Ii1, Ii2 and Ii3 obtained upon pickup of the hologram image according to the gradation pattern do not coincide with the luminance values Io'0, Io'1, Io'2 and Io'3, respectively, decoding based on absolute values of the luminance cannot be performed, and it is necessary to perform decoding based on the sequence of pixels in the block according to the luminance values.

If sequencing of the component pixels based on the luminance values of the hologram reproduction image of FIG. 10A after the luminance unevenness correction is performed, then since they are sequenced as (1)<(2)<(4)<(3), if a pattern having the same array is searched from within modulation patterns illustrated in FIG. 10B, then it can be recognized that the array of the pixels coincide with the modulation code of 0001. Consequently, the reproduction block of FIG. 10A is decoded as 0001.

According to the present embodiment, by determining the gamma characteristic of the hologram recording medium 6 and using luminance values determined based on the gamma characteristic of the hologram recording medium 6 and easily separable from one another to produce a modulation pattern to perform multi-value recording of the data, the bit error rate of reproduction data can be reduced.

Further, by determining luminance unevenness when the data are recorded into and reproduced from the hologram recording medium 6 and correcting luminance unevenness of the reproduction gradation pattern based on the determined luminance unevenness to raise the accuracy of the gamma characteristic obtained as described above, the bit error rate when the multi-value data are reproduced can be further reduced.

Further, by decoding a block of reproduced data depending upon a sequence of relative luminance levels of the pixels in the block to perform decoding of the entire reproduced multi-value data, even if absolute luminance levels cannot be reproduced, correct data can be obtained if differences of the relative luminance levels can be discriminated. Therefore, the bit error rate when multi-value data are reproduced can be reduced further.

It is to be noted that the present invention is not limited to the embodiment described above but can be carried out in various forms in terms of the particular configuration, function, operation and effect without departing from the spirit and scope of the present invention. For example, while the foregoing description of the embodiment is given in connection with block modulation in which four values are used, similar effects can be achieved with block modulation in which 2n (n is a natural number) values are used. Further, if it is permitted for the block to have an arbitrary shape other than a quadrangle, then multi-value recording by block modulation with any values such as five values or seven values can be preformed, and similar effects can be achieved.

What is claimed is:

1. A hologram recording method for recording multi-value data as interference fringes of recording light and reference light into a hologram recording medium, comprising:
    recording a reference gradation pattern into the hologram recording medium;
    measuring a gamma characteristic of the recording medium based on the recorded reference gradation pattern; and
    generating a multi-value modulation code in accordance with the measured gamma characteristic to perform hologram recording.

2. A hologram recording method according to claim 1, further comprising:
    reproducing the gradation pattern from the hologram recording medium; and
    correcting gradations of a modulation image produced by intensity modulating the recording light based on the reproduced gradation pattern.

3. A hologram recording method for recording multi-value data as interference fringes of recording light and reference light into a hologram recording medium, comprising:
    recording fixed luminance data into the hologram recording medium;
    recording a reference gradation pattern into the hologram recording medium;
    reproducing the fixed luminance data from the hologram recording medium;
    acquiring luminance unevenness correction values based on the reproduced fixed luminance data;
    reproducing the gradation pattern from the hologram recording medium;
    correcting luminance unevenness of the reproduced gradation pattern using the luminance unevenness correction values; and
    correcting gradations of a modulation image produced by intensity modulating the recording light based on the gradation pattern whose luminance unevenness is corrected, wherein
    the correcting gradations of the modulation image includes determining a gamma characteristic representative of a relationship between an input luminance and an output luminance to and from the hologram recording medium from the gradation pattern whose luminance unevenness is corrected, and selecting a plurality of output luminance values based on the gamma characteristic, whereafter the gradations of the modulation image are corrected based on input luminance values corresponding to the selected Output luminance values.

4. A hologram reproduction method for reproducing data recorded in multi-values by illuminating illumination reference light on a hologram recording medium, comprising:
    sequencing relative luminance levels of a plurality of pixels in a block corresponding to the reproduced multi-value data to decode the multi-value data.

5. A hologram reproduction method according to claim 4, further comprising:

reproducing data of a fixed luminance value recorded in the hologram recording medium in advance; and correcting luminance unevenness of the reproduced multi-value data based on the reproduced data of the fixed luminance value.

6. A hologram recording and reproduction apparatus which records multi-value data as interference fringes of recording light and reference light into a hologram recording medium and illuminates illumination reference light on the hologram recording medium to reproduce the multi-value data, comprising:

a recording section configured to record a reference gradation pattern into the hologram recording medium;

a reproduction section configured to reproduce the reference gradation pattern from the hologram recording medium; and a correction section configured to measure a gamma characteristic of the recording medium based on the recorded reference gradation pattern and generate a multi-value modulation code in accordance with the measured gamma characteristic to perform hologram recording.

7. A hologram recording and reproduction apparatus for recording multi-value data as interference fringes of recording light and reference light into a hologram recording medium, comprising:

a first recording section configured to record fixed luminance data into the hologram recording medium;

a second recording section configured to record a reference gradation pattern into the hologram recording medium;

a first reproduction section configured to reproduce the fixed luminance data from the hologram recording medium;

a correction value acquisition section configured to acquire luminance unevenness correction values based on the reproduced fixed luminance data;

a second reproduction section configured to reproduce a gradation pattern from the hologram recording medium;

a luminance unevenness correction section configured to correct luminance unevenness of the reproduced gradation pattern using the acquired luminance unevenness correction values; and a gradation correction section configured to correct gradations of a modulation image produced by intensity modulating the recording light based on the gradation pattern whose luminance unevenness is corrected, wherein said gradation correction section measures a gamma characteristic representative of a relationship between an input luminance and an output luminance to and from the hologram recording medium from the gradation pattern whose luminance unevenness is corrected, selects a plurality of output luminance values based on the gamma characteristic, and corrects the gradations of the modulation image based on input luminance values corresponding to the selected output luminance values.

8. A hologram recording and reproduction apparatus according to claim 7, further comprising:

a block modulation recording section configured to record multi-value data by block modulation into the hologram recording medium;

a reproduction section configured to reproduce the block modulation data from the hologram recording medium; and a decoding section configured to sequence relative luminance levels of a plurality of pixels in a block corresponding to the reproduced multi-value data to decode the multi-value data.

9. A hologram recording and reproduction apparatus according to claim 7, further comprising:

a luminance unevenness correction section configured to correct luminance unevenness of the reproduced multi-value data based on the reproduced fixed luminance data.

* * * * *